US006785226B1

United States Patent
Oltman et al.

(10) Patent No.: US 6,785,226 B1
(45) Date of Patent: Aug. 31, 2004

(54) SYSTEM AND METHOD FOR DATA ROUTING OVER A NETWORK

(75) Inventors: David Kelly Oltman, Orlando, FL (US); Jim Harris, Orlando, FL (US)

(73) Assignee: Carriercomm, Inc., Santa Barbara, CA (US)

( * ) Notice: Subject to any disclaimer, the term of this patent is extended or adjusted under 35 U.S.C. 154(b) by 0 days.

(21) Appl. No.: 09/388,822

(22) Filed: Sep. 1, 1999

(51) Int. Cl.[7] .................. G06F 11/00; G06F 15/173
(52) U.S. Cl. ............... 370/228; 370/221; 370/225; 370/421; 709/239
(58) Field of Search ................... 370/216–228, 370/257, 364, 365, 420, 421; 709/230, 232, 236, 237, 239

(56) References Cited

U.S. PATENT DOCUMENTS

| 5,239,673 A | * | 8/1993 | Natarajan |
| 5,831,975 A | * | 11/1998 | Chen et al. |
| 5,850,526 A | * | 12/1998 | Chou |
| 5,898,826 A | * | 4/1999 | Pierce et al. |
| 5,903,559 A | * | 5/1999 | Acharya et al. |
| 5,959,989 A | * | 9/1999 | Gleeson et al. |
| 6,032,194 A | * | 2/2000 | Gai et al. |
| 6,222,848 B1 | * | 4/2001 | Hayward et al. |
| 6,308,282 B1 | * | 10/2001 | Huang et al. |
| 6,330,614 B1 | * | 12/2001 | Aggarwal et al. |
| 6,331,983 B1 | * | 12/2001 | Haggerty et al. |
| 6,359,880 B1 | * | 3/2002 | Curry et al. |
| 6,366,584 B1 | * | 4/2002 | Gulliford et al. |
| 6,373,826 B1 | * | 4/2002 | Russell et al. |
| 6,400,722 B1 | * | 6/2002 | Chuah et al. |
| 6,434,129 B1 | * | 8/2002 | Struhsaker et al. |
| 6,496,505 B2 | * | 12/2002 | La Porta et al. |

* cited by examiner

Primary Examiner—Afsar Qureshi
(74) Attorney, Agent, or Firm—Fulbright & Jaworski L.L.P.

(57) ABSTRACT

The present invention relates in general to communication networks. In particular, the invention relates to a communication network in which nodes communicate via radio connections employing Ethernet protocol in a ring configuration which provides for fault tolerance and prevention of infinite communication loops. In a preferred embodiment, the network is in a ring configuration and comprises two routers for enabling fault tolerance in the event of a malfunctioning communication link and for preventing infinite message forwarding around the ring network. VLANS may be beneficially employed to assist with rerouting of data communication traffic in the event of a communication link failure and to aid in isolating customer network data from unauthorized viewing.

69 Claims, 2 Drawing Sheets

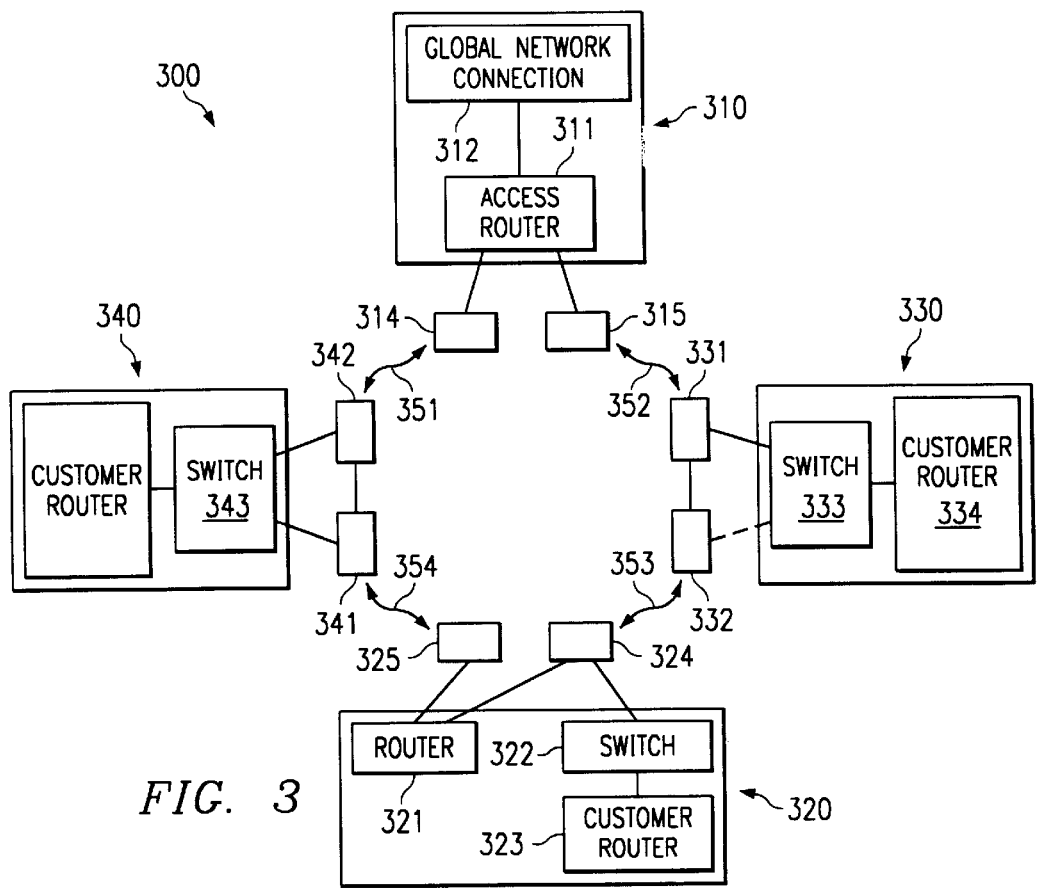
FIG. 3
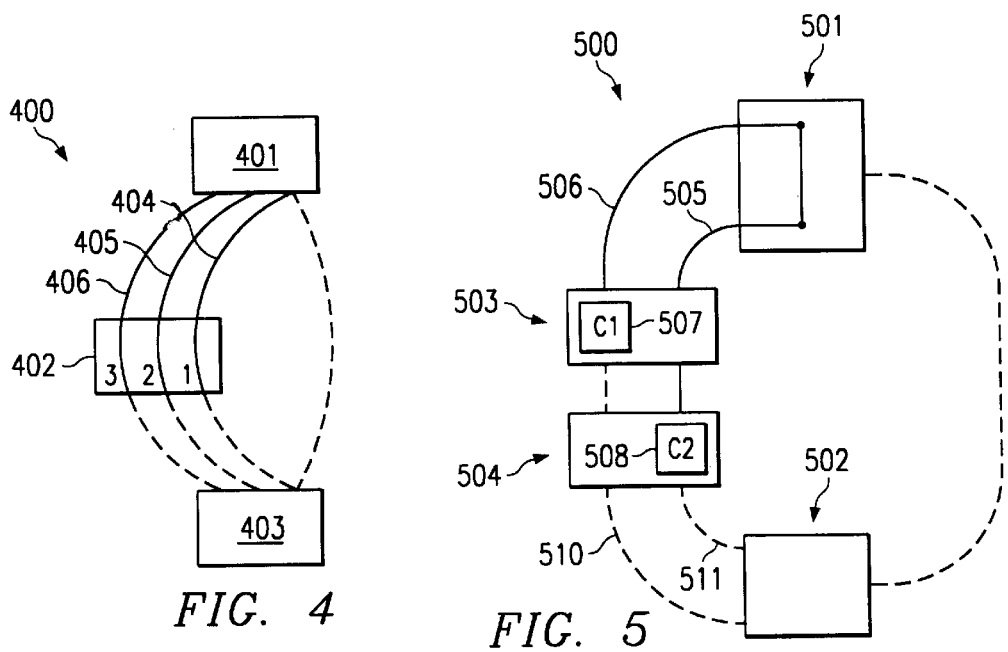
FIG. 4
FIG. 5

SYSTEM AND METHOD FOR DATA ROUTING OVER A NETWORK

RELATED APPLICATIONS

Reference is made to the following co-pending and commonly assigned U.S. patent applications: Ser. No. 09/245,701, entitled "COMMERCIAL NETWORK BASED ON POINT TO POINT RADIOS" filed Feb. 6, 1999, Ser. No. 09/293,331, entitled "RADIO WITH BASEBAND INTERFACE", and Ser. No. 09/325,492 entitled "ETHERNET NETWORK INTERFACE FOR MICROWAVE RADIO", the disclosures of which are incorporated herein by reference.

TECHNICAL FIELD

The invention pertains to communication networks in general and in particular to system and method for providing fault tolerance in an Ethernet based network communication system.

BACKGROUND

Communications networks typically include multiple nodes which communicate with each other over communications links. It is useful to think of the nodes as separate from the communications links, since they are often provided, maintained, and operated by different organizations and generally include and/or are coupled to termination devices actually utilizing the data or information communicated through the network. Each node in a network may include or be coupled to one or more computers or other information processing system, such as a telephony device, generically referred to herein as the "node computer", for performing a variety of tasks. Each node can communicate directly with one or more other nodes through communications links, which might be implemented with wires, optical fiber, radio transmissions, and/or some combination of these. Each link is often terminated at each end with an interface device, such as a modem or network interface card (NIC), which converts the signals from the associated node computer into and from a format suitable for the particular type of link. The information to be communicated between nodes can be generically referred to as "user data", and it allows the various nodes to perform their functions in a distributed manner. The standard industry term "user data" is a carry-over from the early days of computers, and does not imply that a human user must be involved. The content of user data is typically independent of the type of communications links being used.

It is desirable for any node in a network to be able to communicate a user message (i.e., a quantity of user data) to any other node. The most direct way of accomplishing this is to provide a separate link from every node to every other node, and let the transmitting node select the proper link for a given message. However, if the network has very many nodes, the number of links required would be prohibitively expensive. To avoid this problem, many networks allow a message to be passed from node to node, or via some other form of shared use link, until the message reaches its final destination. This greatly reduces the number of links needed to send a message from any node to any other node. In "ring" networks (the nodes are connected in a loop), each node will typically have only two links, connecting it to two other nodes, and every message is simply passed around the loop until it reaches its destination node.

In a typical network, every user node is assigned a network "address" and every message contains the address of its destination node. Nodes have the capability to examine the address of a received message, keep and process the message if it sees its own address, or forward the message to another node if it does not see its own address.

While most conventional network links are "hard" links (copper wire or fiber-optic), network communications over radio links have also been developed. Large scale microwave networks may be deployed using millimeter wave technology, such as shown in the above referenced patent application entitled "COMMERCIAL NETWORK BASED ON POINT TO POINT RADIOS" involving the deployment of hundreds of links in a service area. Each of these links may carry customer traffic for the services provided by a telecom operator or other service provider, i.e., the traffic can be Internet e-mails, phone calls, video conference calls, etc. and/or these links may carry customer traffic for the services of another type of service provider, such as a computer network service provider, or even a private system's traffic.

One protocol for providing communication among nodes in a network is the Ethernet networking system. Ethernet protocol defines a shared bus topology in which all nodes on a network generally have access to all data placed on the network. While Ethernet is a common and convenient networking system, it lacks an effective mechanism for link fault tolerance. Therefore, the existence of a faulty connection could disrupt communication on a network without there being a built in remedy to address the disruption.

Where the network is entirely contained within a secure environment, a shared bus topology may not be problematic. However, where it is desired to protect the security and privacy of data associated with each node on a network from access by any other node on the network, standard Ethernet operation could present the problem of network users having access to data which is not intended or authorized.

Therefore, there is a need in the art for establishing link fault tolerance in an Ethernet or other shared link based networking system.

There is a further need in the art for a mechanism to provide security and privacy for data associated with a particular node in an Ethernet environment.

SUMMARY OF THE INVENTION

These and other objects, features and technical advantages are achieved by a system and method which conducts communication between a plurality of nodes in a network employing Ethernet or other form of Open Systems Interconnection (O.S.I.) layer two switching in a point to point transmission scheme. Routers or other form of layer three network data routing device may be advantageously incorporated at selected points in the network to provide redundant communication paths and thereby enable fault tolerance and prevent infinite looping of messages through the network. This network configuration may be referred to as consecutive point transmission. In this application, when no specific O.S.I. level is identified in connection with the term "switch", the term "switch" refers to a layer two switch.

In a preferred embodiment, the network comprises nodes which are serially connected to form a complete ring wherein each node in the ring communicates with immediately neighboring nodes in both directions around the ring. This configuration preferably comprises routers at opposed ends of the ring network to control the transmission of messages within the network. This configuration provides fault tolerance by presenting alternative paths around the ring for any particular transmission.

In a preferred embodiment, communication between nodes in the communication network is achieved via wireless radio links preferably in the millimeter wave band to provide bi-directional communication between serially linked nodes. Alternatively, wired connections incorporating copper wire or fiber optic cable may be employed to provide for bi-directional communication between network nodes. In this application, the term "serially linked" does not refer to a communication format or protocol, but rather to a physical connection configuration of a sequence of network nodes. This may alternatively be described as a chain or daisy chain of nodes in direct sequence. A ring network is one particular network configuration of such a set serially linked nodes.

In a preferred embodiment, a number of O.S.I. layer two protocols may be employed for communication between nodes within a network, whether in a ring or other configuration. Such protocols include but are not limited to: Ethernet and token ring. Preferably, the layer two protocols appropriately cooperate with protocols in different layers within the open systems interconnection model.

A preferred embodiment ring configuration of a consecutive point transmission system employing radio Ethernet communication presents the advantage of inherently providing for redundant paths between any two nodes in the network. This feature would be absent in a straight line point to point transmission system. In a straight line configuration, a fault in a link between nodes would leave parts of the network isolated from each other barring the introduction of an extrinsic link to compensate for the malfunctioning link. (Generally, the deployment of Ethernet, or other O.S.I. layer two protocol, in a ring configuration under normal circumstances, presents the problem of a an infinite communication loop, or communication "short circuit", being created. Specifically, messages or data packets transmitted from a node in a particular direction around the ring could circle around the ring indefinitely ultimately resulting in network performance degradation or failure due to endless transmission of these messages or data packets. This is a known property of Ethernet and is one reason why Ethernet is generally not used for communication between nodes in a ring network.

In a preferred embodiment of the present invention, the problem of "infinite loop" transmission is resolved by deploying IP or other O.S.I. layer three routers at strategically located points in the network. The routers may serve as nodes by themselves or be located within nodes having other communication equipment. Preferably, two router nodes (the nodes containing routers) are placed at opposed ends of the ring network thereby separating the ring into two substantially equal halves for optimal operation. Alternatively, the routers need not be placed at opposed ends of the ring but could be placed in a range of different possible locations within the ring and still provide the network with the features of fault tolerance and infinite loop prevention. In an alternative embodiment, more than two routers could be deployed within the ring network and placed in a range of possible locations within the network so as to optimize control over message traffic through the network.

In a preferred embodiment, at least two different types of routers have specific and separate functions. A first router, referred to herein as an access router, preferably operates as the communications center of the entire network. The second router, referred to herein as an end router, preferably operates to replace part of the function of the access router if there is a malfunction in a communication link connecting two nodes in the network. In an alternative embodiment, where more than two total routers are employed within a ring network, there would preferably still be just one access router but the number of end routers would increase. In yet another alternative embodiment, there could be more than two types of routers in the network.

Preferably, all nodes communicate with the outside world and with each other by having all their communication routed to the access router first, wherein the access router then proceeds to communicate the transmitted information back onto the network toward the designated recipient for a recipient located within the network, or alternatively onto a wide area network such as the Internet where the recipient is located remotely from the consecutive point network. This applies even to nodes in the network which are in the same "half" of the ring, or otherwise stated, which are not separated by router nodes. It is noted here that nodes which are not designated as "router nodes" are preferably connected to the network by switches employing Ethernet switching or other form of O.S.I. layer 2 switching.

The nature of the Ethernet standard is generally to provide open access by all parties connected to a network to all data placed on the network. This feature presents a problem when present on a network where it is desired to protect the security and privacy of data belonging to individual users, or customers, from access by the outside world in general (such as from the Internet connection to the Access router) and by other customers within the ring network, whether on the same or different nodes.

In a preferred embodiment of the present invention, a combination of virtual LANs (VLANs) and sub-networks operate to protect the privacy of data of individual customers. The VLANs operate at O.S.I. layer two, and the sub-networks at O.S.I. layer three. Employing the VLANS and the sub-network structure, customers conduct all communication by both transmitting and receiving information along their respective private VLANs between their respective ports on a network node and the Access router of the ring network. The Access router then appropriately routes the data to the intended destination. If the communication is between two customers within the ring network, the Access router receives the information on the sender's VLAN, transfers it to the receiver's VLAN within the Access router, and then transmits the information along the ring network within the receiver's VLAN in a manner which makes the transmitted information unreachable by all except the intended recipient. The Access router thereby preferably operates as a bridge between the various customer-specific VLANs. It is noted that, in a preferred embodiment, a plurality of VLANs and subnetworks can co-exist on the same physical network and the same internodal communication links.

The use of Ethernet creates a flexibility and ease of communication which is advantageous for most purposes. Under certain circumstances, the ability of customers on nodes within the preferred embodiment ring network to communicate directly with each other via the shortest path might be desirable. However, in the preferred embodiment, it is desired that all communication, including that occurring between customers located within the ring network, be routed through the Access router for purposes of monitoring, control, and metering. It is desired that the service provider which operates the ring network and the Access router be able to meter the communication occurring on any part of the network, including that between customers on the network, so that appropriate billing be conducted.

The deployment of VLANs and subnetworks effectively forces all communication on the network to pass through the Access router before it can reach an intended recipient. Accordingly, as the Access router performs the required bridging function to transfer information from one customer VLAN to another, appropriate measurement of characteristics, including but not limited to the data volume, communication speed, and traffic type (e.g. FTP, voice over IP, HTTP) of the communication being transacted may be recorded for both billing purposes and system performance monitoring purposes.

In a preferred embodiment, the links between the nodes in the inventive communication network are provided by radio frequency transmissions thereby creating a wireless network. Connections between components located within any one node are preferably wired links but alternatively may be accomplished by wireless connections.

Therefore, it is an advantage of the present invention that fault tolerance can be implemented in a network employing Ethernet switching.

It is a further advantage of the present invention that infinite loop transmission of messages is avoided employing the features of the present invention.

It is a still further advantage of the present invention that security can be provided for each of a plurality of end users of the communications network which permits only a designated recipient to view a particular message transmission.

It is a still further advantage of the present invention that control, monitoring, and metering of network usage by various end users on the network can be provided by forcing all communication to be transmitted through an Access router before being directed to an intended recipient on the inventive network or on the Internet.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 3 is a detailed depiction of a network of nodes deployed in a loop configuration according to a preferred embodiment of the present invention;

FIG. 4 depicts a plurality of virtual LANs implemented on a network according to a preferred embodiment of the present invention; and FIG. 5 depicts a communication path between customers on a network according to a preferred embodiment of the present invention.

DETAILED DESCRIPTION

Figure 1:
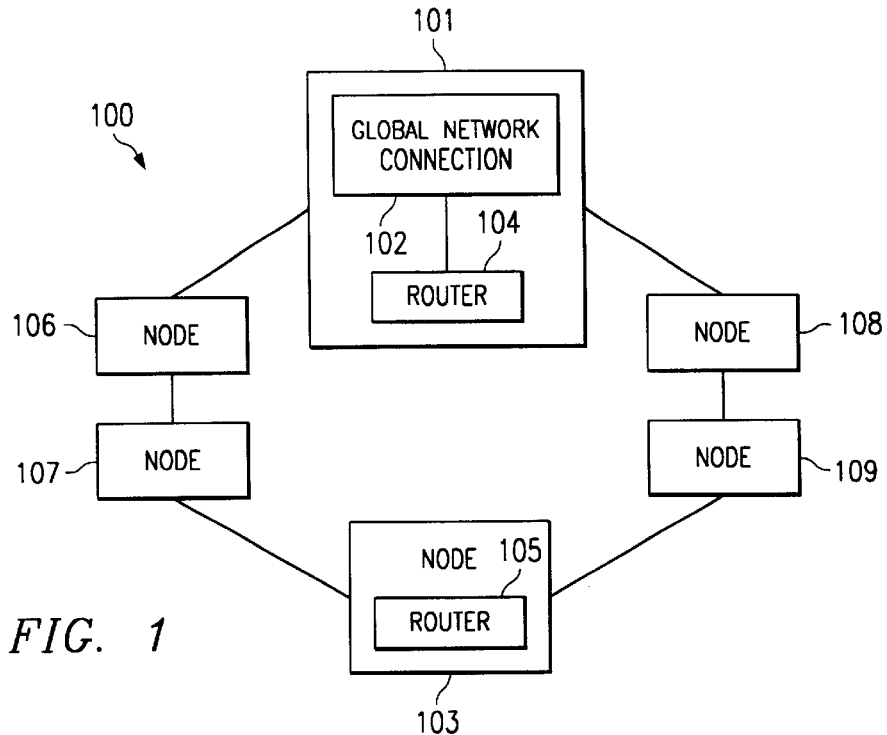
FIG. 1 depicts a network of nodes deployed in a loop configuration according to a preferred embodiment of the present invention.

FIG. 1 depicts a network 100 of nodes deployed in a loop configuration according to a preferred embodiment of the present invention. Network 100 depicts a serial connection of nodes in a ring or single loop configuration which ring is preferably divided into two parts by routers 104 and 105. Preferably, each node is in communication with its immediately neighboring nodes in the clockwise and counter-clockwise directions. For example, node 108 is in direct contact with nodes 109 and 101. Communication between node 108 and nodes other than 101 and 109 will occur via either node 101 or node 109. The point to point connection between the various nodes preferably comprises wireless communication means. Alternatively, other link media may be utilized, such as wired or optic communication links, or combinations thereof.

In a preferred embodiment, two routers are deployed at opposite ends of the ring as displayed in FIG. 1, where router 105 in node 103 and router 104 in node 101 are so deployed. Dividing up the ring in this manner is preferable because it enables substantially equal levels of communication traffic to be present on both segments of the divided ring. Alternatively, the routers could be located in an asymmetric manner within the network. An asymmetric arrangement of routers within the network may be beneficial where network communication traffic is disproportionately heavy on a network segment having a relatively small number of nodes or where one segment of a network comprises nodes with a higher than usual tendency to experience communication link failures (due to external factors such as radio interference or power failures) or where such communication link failures have particularly severe consequences. In an alternative embodiment, more than two routers may be deployed within the network. Where more than two routers are deployed in the network, the total preferably comprises one access router and a plurality of end routers. However, a network comprising one or more access routers and/or one or more end routers is within the scope of the present invention.

In a preferred embodiment, node 101 serves as the communications center of network 100 both for communication between the various nodes on network 100 and for communications with other networks including a global network connection 102 such as the Internet. For this reason, it may be desirable for each node to employ the shortest path available to communicate information to node 101, which may be called the gateway node. Node 101 preferably serves as a hub or gateway for all communication within the network 100 when no fault condition exists. Node 101 may optionally comprise a second router in addition to access router 104 to provide for redundancy in the event that access router 104 experiences a failure condition.

In a preferred embodiment, while nodes 101 and 103 comprise routers 104 and 105 respectively, the remaining nodes in the network direct communication information whether configured in the form of packets, messages, or other information package, employing O.S.I. layer 2 switching technology. Ethernet protocol is one such O.S.I. layer 2 switching technology and is a preferred protocol for use in the network of the present invention. It is noted that nodes 101 and 103 are not restricted to using routers but may optionally also comprise switches for directing data within their respective nodes.

Alternatively, routers may be placed in any link, such as at or within any node, within the network 100. Deploying a router a within a node is generally not necessary where there are already two routers deployed within the network as depicted in network 100. However, deploying a router within a node, in addition to the two routers already provided, may provide equipment within that node with greater control over communication to, from, and within the node than is available with an Ethernet or other O.S.I. layer two switch. It is also noted that, in general, routers are more expensive and slower to transmit data through than O.S.I. layer two switches. Accordingly, layer two switches are preferably deployed for their greater speed and lower cost unless specific circumstances justify the deployment of a router.

The combination of the preferred embodiment ring network with Ethernet switching presents the possible problem of infinite forwarding of messages around the ring, or a communication "short circuit". Introducing routers at selected locations within a ring network and configuring the routers so as to create a logical break in the network preferably resolves the problem of infinite message forwarding by providing for more powerful communication control which is available with O.S.I. layer three routing.

Fault tolerance is a desirable feature of any communication network. In a straight line point to point communication network, the failure of a link would leave portions of the network isolated from each other barring the addition of an extrinsic "override" communication path to enable nodes within the network to bypass a faulty link within the network. An advantage presented by the preferred embodiment ring network is that of having built-in fault tolerance in the event of a link failure between any two nodes in the network 100.

In a preferred embodiment, what would otherwise be a continuous serial link between a sequence of nodes in the ring network 100 is logically broken into two logical segments through the introduction and configuration of end router 105 so as to create a logical break in ring network 100. In the event of a link failure which causes an actual break in communication along the ring network 100, the routers may cooperate to logically break up the network 100 at the point in the network where the actual break exists. During such a failure condition, the end router 105 is enabled as an alternate communication path to the access router 104 for those nodes whose usual communication path to the access router 104 is disrupted by the actual break in the network 100. This arrangement enables all nodes in the network to preserve communication with the access router and to thereby preserve communication with the senders and receivers of information within the nodes in the event of a single link failure.

In a preferred embodiment, the deployment of access router 104 and end router 105 cooperate to define two logical network segments, where each segment preferably includes a substantially equal number of nodes, and where each segment preferably comprises bi-directional communication among its nodes thereby enabling any node to communicate with any other node within its segment. It is noted that node 101 which includes access router 104 would be a part of both such logical network segments.

In a preferred embodiment, where no communication link fault exists, nodes 106, 107 and 101 would form a first logical network segment, and nodes 109, 108 and 101 would form a second such logical network segment. It is noted that other network embodiments could include any number of logical network segments. Thus, bi-directional communication would take place along node sequence 107-106-101 to enable all inbound and outbound communication between each of nodes 106 and 107 and any other node or communication device whether located on network 100 or at a remote site with which communication is enabled by access router 104 via a wide area network connection. In like manner, bi-directional communication along node sequence 109-108-101 would enable all inbound and outbound communication between each of nodes 108 and 109 with any other node or communication device whether on network 100 or at a remote site. However, upon experiencing a failure in one of the inter-nodal links enabling communication between any of nodes 106 to 109 and node 101, a contingency communication scheme is preferably put into effect which entails using node 103 and router 105 to route messages along an alternative path.

For example, in a preferred embodiment, if the link between node 108 and node 101 experiences a failure, the right side path, specifically the 109-108-101 path would no longer be available for nodes 108 and 109 to communicate with node 101. Where such a disruption occurs in the 101–108 link, routers 104 and 105 and the layer 2 switches in the remaining nodes cooperate to re-direct data from nodes 108 and 109, in the clockwise direction within the layout of FIG. 1, employing node 103, the "bypass node", and its incorporated router 105, and switches in the remaining nodes, toward gateway node 101. In this manner, the preferred embodiment ring network preferably incorporates inherent fault tolerance, meaning that the network 100 is able to recover from a failure in a single inter-nodal link using only equipment in the original network 100. The recovery is preferably performed "on the fly" by adjusting routing tables at the routers 104 and 105 in nodes 101 and 103 respectively, and switching tables in the remaining nodes.

In a preferred embodiment, routers 104 and 105 in the network 100 detect and adjust for link failures in the network 100 using dynamic routing protocols. While employing such dynamic routing protocols, routers conduct continuous monitoring of the network 100 by sending out messages and anticipating responses to such messages. The routers can thereby detect an absence of a node which unexpected fails to respond to a message or "hello packet" as well as detect the presence of a new node by unexpectedly receiving a message from a node of which the router was not previously aware. Dynamic routing protocol also enables the routers to adapt to detected faults in the network by changing data transmission paths based on remaining functioning communication links. A typical latency period for detecting a fault in the network is 20 seconds. Generally, the latency period will increase with the size of the network and particularly where the number of routers increases.

Dynamic routing protocols are well known in the art and will therefore not be discussed in further detail herein. One dynamic routing protocol available for use in network 100 is EIGRP. However, other dynamic routing protocols could be substituted for EIGRP and all such alternatives are within the scope of the present invention.

The preferred embodiment depicted in FIG. 1 comprises a ring, or single loop configuration. This is one configuration which enables the network 100 to provide built-in fault tolerance. Other configurations are available which also provide such built-in fault tolerance and all such alternative configurations are included within the scope of the present invention.

For example, a network comprising a plurality of nodes, with appropriately selected nodes including routers, could be configured so as to include multiple loops and complex interconnections and still provide built-in fault tolerance. Preferably, each such alternative network provides at least two paths between any one node and any other node in the network so as to provide for fault tolerance and to prevent infinite message forwarding.

Figure 2:
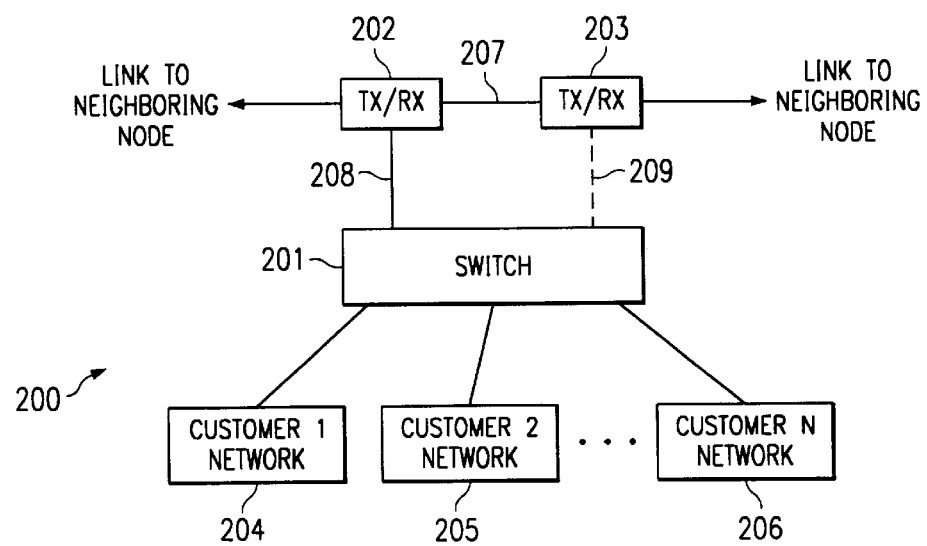
FIG. 2 depicts components within a node according a preferred embodiment of the present invention.

FIG. 2 depicts components within a node 200 according a preferred embodiment of the present invention. Node 200 is generally representative of nodes 106, 107, 108, and 109 of FIG. 1 which are preferably connected to the network via an Ethernet switch or other layer 2 switching protocol.

In a preferred embodiment, inter-nodal communication devices 202 and 203 each conduct bi-directional point to point communication with their respective immediately neighboring nodes within a serially linked network whether configured as a ring network or other network configuration. Preferably, communication devices 202 and 203 employ radio frequency communication. One particular embodiment of point to point radio communication available for devices 202 and 203 is the Invisible Fibre Unit™, (hereinafter "IFU" which is described in co-pending commonly assigned patent application Ser. No. 09/293,331, entitled "RADIO WITH BASEBAND INTERFACE"). Arrows emerging from communication devices 202 and 203 depict the bi-directional communication links to the respective neighboring nodes of devices 202 and 203.

In a preferred embodiment, the node 200 comprises O.S.I. layer 2 switch 201 for appropriately directing data between the network 100 (FIG. 1) and various possible locations within the node 200. Alternatively, the switch 201 could be replaced with an O.S.I. layer three router. However, there is generally a greater delay when passing data through a router than through a switch. Further, routers are generally more expensive than switches. Therefore, if the rest of the system is set up such that a switch is acceptable, the network should be both less expensive and faster than if routers were universally deployed at the various nodes.

Employing the preferred embodiment switch 201 along with the communication devices 202 and 203 and the customer networks 204–206 presents the possibility of an infinite looping problem with respect to the interconnection of elements 201, 202, and 203. With communication devices 202 and 203 both connected to switch 201, a communication "short circuit" or infinite loop could arise among these three elements when employing Ethernet switching. It is noted that this problem would not arise if a router were deployed in place of the switch 201.

In a preferred embodiment, each customer network of customer networks 204–206 may comprise a range of possible types of user equipment including but not limited to: personal computers, wired telephones, wireless transmitters including wireless telephones, local area networks to serve a plurality of computing and communication devices, servers for local area networks, telephone exchange equipment, and other data communication interfacing apparatus. Each customer network may further comprise its own router to appropriately control transmission and reception of data passing through the customer network.

In a preferred embodiment, the problem of an infinite transmission loop when using the preferred embodiment switch 201 is addressed by effectively disconnecting the link 209 between communication device 203 and switch 201 thereby breaking up the loop. With this link broken, all communication between communication device 203 and switch 201 uses communication device 202 as an intermediate device.

In a preferred embodiment, the process of disabling link 209 (or, alternatively link 208) is accomplished automatically. Preferably, the switch 201 is able to detect a loop and "break" the loop by disabling one of the links, such as link 209, forming the loop. The designation of enabled and disabled links will remain in place unless the switch 201 detects a link failure in one of the enabled links, such as in link 208. If link 208 were to become disabled, the switch 201, would re-enable link 209 so as to re-establish full communication between the communication devices 202 and 203 and the rest of node 200. The above is preferably accomplished via an implementation of Spanning Tree Protocol which is preferably incorporated into the functionality of the switch 201.

Therefore, in a preferred embodiment, data addressed to a device within node 200, arriving at device 203, would travel first along link 207 to device 202 and then along link 208 to switch 201. At that point, the switch 201 would direct the data appropriately based on its intended destination within node 200.

In a preferred embodiment, the individual communication devices 202 and 203 incorporate switching functionality thereby enabling the devices to direct data which is not addressed to a destination internal to node 200 along the rest of the network without experiencing any unnecessary delay associated with having node switch 201 handle the data.

In a preferred embodiment, outbound data would be handled in a parallel manner. Data heading out of node 200 which requires transmission from device 203 is directed to switch 201, then to device 202, then to device 203 and then along an inter-nodal link to communication device 203's neighboring node.

In a preferred embodiment, once inbound data has reached the switch 201, the switch directs the inbound data to a customer network. One or more customer networks may be deployed within any one node 200. In order to control data reception and transmission at each customer network, where a switch 201 is deployed in the node, each such customer network preferably includes its own router. Such a customer router is beneficially employed to ensure data is properly directed within the node and the network.

In an alternative embodiment, the need for a router within each customer network can be removed if a layer three router is deployed in place of the layer two switch 201. The considerations favoring deployment of a switch in place of a router have been previously discussed and will not be repeated here.

FIG. 3 is a detailed depiction of a network of nodes deployed in a loop configuration according to a preferred embodiment of the present invention. Network 300 is shown with some detail pertaining to the individual nodes displayed. In a preferred embodiment, gateway node 310 is similar to node 101 in FIG. 1. Node 310 includes access router 311 and global network connection 312. A customer network and router (not shown) could optionally be included in node 310 along with the access router 310 and global network connection 311. Such a customer network would interact with the rest of the network in much the same way as customer networks located on other nodes, meaning that a layer two switch would preferably be interposed between a pair of inter-nodal communication devices and one or more customer networks within the node. Customer networks were previously discussed in connection with FIG. 2.

Inter-nodal links 351–354 are shown connecting the inter-nodal communication devices to their respective neighboring nodes throughout the network 300. An example of data forwarding through the network is instructive. Communication between switch 322 and access router 311, where all links are operational, would preferably involve sending data to communication device 324, which in turn transmits across inter-nodal link 353 to communication device.332 on node 330, where node 330 is the neighboring node to communication device 324. The data would then proceed to communication device 331.

In a preferred embodiment, either Ethernet or other layer two switching is available right in the inter-nodal communication devices, such as devices 332 and 333, enabling switching decisions to be made without requiring the operation of node switch 333. In this case, the data, which is destined for access router 311, will be directed along inter-nodal link 352 by communication device 331 without ever directing the data toward switch 333. The data will then be received by communication device 315 and forwarded to access router 311 as originally intended by the originating device.

Bypass node 320 optionally includes a switch 322 which is connected to a customer router 323 as well as inter-nodal communication device 324. It is noted that the end router 321 preferably does not handle data communication unless there is a link failure somewhere in the network 300. However, router 321 may regularly receive and transmit network status information with neighboring nodes employing inter-nodal communication device 325. Generally, where no fault condition exists, end router 321 receives data traffic but doesn't continue the link. The contingency communication scheme arising in the case of a link failure is discussed in greater detail in connection with FIG. 1.

In a preferred embodiment of the present invention, each of nodes 310, 320, 330, and 340 are located within separate buildings in a metropolitan area, thereby providing customers within these buildings with access to a rapid communication pipeline to access router 311 and ultimately to the Internet via global network connection 312. In an alternative embodiment, a single node may include connections to a plurality of neighboring buildings. In yet another alternative embodiment, a plurality of nodes may be located in a single building. This last embodiment may be beneficial if the building has a particularly large number of customers making it difficult to properly service all the customers employing a single node having a single switch.

FIG. 4 depicts a plurality of virtual LANs implemented on a network 400 according to a preferred embodiment of the present invention. In the FIGURE, LANs 404-406 are shown which run from gateway node which includes access router 401 through node 402 to end router 403 and back to access router 401.

Virtual local area networks (VLANS) are described below in connection with providing security for customer data, as well as the ability to provide the network 100 (FIG. 1) with the ability to monitor, control, and meter data communication by a plurality of customers. However, VLANS are also preferably advantageously employed to assist in responding to a communication link failure within the network 100 (FIG. 1).

In a preferred embodiment, when a communication link fault is detected, data communication from certain nodes whose normal communication path to the access router 104 (FIG. 1) is disrupted will have their data routed to the access router 104 (FIG. 1) in a direction opposite to that employed under normal network conditions. Preferably, during a fault condition, the re-routed data is placed on a different VLAN than that used during a no-fault communication condition to ensure appropriate data transmission and reception along a contingency path between an affected node and the access router 104 (FIG. 1). Preferably, the fault condition VLAN is advantageously employed to preserve the security and privacy of customer data during the fault condition just as the previously used VLAN did during the no fault network condition.

In a preferred embodiment, the end router 105 (FIG. 1) operates to separate the network into two logical segments under normal (i.e. no fault) operating conditions. In the event of a fault condition, the end router 105 (FIG. 1) preferably acts to relocate the logical break in the network 100 (FIG. 1) to the point where the actual break is located, as has been previously discussed. In this manner, a virtual local area network is then preferably created connecting the nodes into a single serially linked network segment, which segment has termination points dictated by the location of the actual break in the network.

In a preferred embodiment of the present invention, it is desired to keep each customer's data protected from the world at large and from other customers connected to the network 400. Thus, although a single physical connection may be present along the network between the access router 401 (which is preferably housed within the gateway node), a mechanism is required to ensure that different customers on node 401 and/or other nodes can access only their own data. It is also desirable to force all customer communication to be funneled through the access router 401 for purposes of monitoring, control, and metering (for billing purposes)of customer communication.

In a preferred embodiment of the present invention, the desired privacy and security of customer communication as well as the centralization of customer communication at the access router 401 is achieved by implementing a plurality of customer specific virtual local area networks, or VLANs which operate on a single physical link between the access router and the various nodes in the network 400.

An example of the virtual LAN implementation is depicted in FIG. 4. Customers 1, 2, and 3 all operate on node 402 within network 400. Although the data directed to all three VLANs is communicated along the same hardware link, the preferred embodiment layer two switch within node 402 is able to identify and appropriately direct data among the various VLANs after acting upon the incoming data.

The solid lines shown between the access router 401 and node 402 depict the preferred communication paths for data communication between the access router 401 and the customer VLANs within node 402. Preferably, these paths would be employed if all links between the node concerned and the access router 401 were operational. The dotted line which completes a loop for VLANs 404-406 represent the path that each of the VLANs would take if a communication link on the preferred path between node 402 and the access router 401 were faulty. The dotted line heads first to end router 403 and subsequently around the rest of the network back to access router 401. Depiction of nodes on the right side of network has been omitted for the sake of brevity and simplicity. Preferably, the path depicted by the dotted line, which incorporates use of end router 403, is employed only when communication along the preferred path is not available.

In a preferred embodiment, the redirection of the VLAN communication path in case of a faulty link is made possible by sub-networks connecting the various customer ports on each node with the rest of the network including the end router 403 and access router 401. The O.S.I. layer three routers (not shown) within the customer networks in each node enable the customer networks to direct data along either the solid line path or the dotted line path for each VLAN depending upon the condition of the network.

FIG. 5 depicts a communication path between customers on a network 500 according to a preferred embodiment of the present invention. Customer 1 507 is shown within node 503 and customer 2 508 is shown within node 504. The following is a description of a communication scheme between two customers on the inventive network according to a preferred embodiment of the present invention.

In a preferred embodiment of the present invention, the preferred communication path between customer 1 507 and access router 501 is shown as solid line 506. In the event of a link failure which disrupts the preferred route represented by solid line 506, customer 1 507 would preferably transmit data to the end router 502 along dotted path 510. The data from customer 1 507 would subsequently be transmitted to access router 501 along a "backhaul" path shown as a single dotted line on the right hand side of FIG. 5. In like manner for customer 2, the preferred communication path between customer 2 508 and access router 501 is shown by solid line 505. However, in the event of a fault condition which disrupts the preferred route represented by solid line 505, customer 2 508 would preferably transmit data to end router 502 along dotted path 511. The data from customer 2 508 would then preferably be transmitted to the access router 501 employing the backhaul path shown by a single dotted line on the right hand side of FIG. 5. Preferably, alternate paths are employed only in the event of a link failure between the customer or node concerned and the access router 501.

Preferably, all customers within the network 500 conduct communication employing the network, whether with someone on the Internet or another customer on the network 500, by using the access router as a gateway for all such communication. Assuming that all communication links are operational, customer 1 507 first sends data along path 506 to access router 501 where it is received at a first end of a bridge. If all required communication parameters are satisfied, access router 501 transmits data received along path 506 from customer 1 507 onto path 505 directed toward customer 2 508 inside node 504. The switch in node 504, upon receiving the data, will then preferably direct it to customer 2 508.

In a preferred embodiment, funneling the data in this manner provides the network 500 the ability to control, monitor, and meter communication occurring on the network. Based on communication parameters such as passwords or other security measures, the access router can either authorize or refuse to authorize a particular data transmission, or to grant access by a user to a particular data transmission received from the Internet or from another user on the network 500. This arrangement enables the network to keep track of the type and quantity of data transmitted, which users are sending and receiving data, and other parameters of network usage. Moreover, the network 500 is provided with information relevant to billing appropriate users based on one or more of a number of parameters including, but not limited to: the amount of connection time, the quantity of data transmitted, and the overall extent of system resources expended to serve a particular customer.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for routing data over a network having a plurality of nodes, the system comprising:
   a plurality of serially linked network nodes, wherein each node of said plurality of nodes comprises a radio communication link to at least one immediately neighboring network node; and
   at least two routers disposed in said plurality of serially linked network nodes that cooperate to provide fault tolerance in case of a radio communication link malfunction and to prevent infinite message forwarding along said serially linked network nodes, wherein said tow routers create a logical break positioned in said network so as to create two substantially equal communication segments in said network.

2. The system of claim 1, wherein said plurality of serially linked network nodes form a ring network.

3. The system of claim 2, wherein O.S.I. layer two protocol is employed on said network.

4. The system of claim 2, wherein Ethernet protocol is employed on said network.

5. The system of claim 1, wherein said two routers comprise:
   an access router at one node of said plurality of serially linked network nodes for serving as a communications hub for said network; and
   an end router at another node of said plurality of serially linked network nodes for creating a logical break in the network thereby enabling said fault tolerance in said network.

6. The system of claim 5, wherein, during a fault condition, said end router relocates said logical break in the network to a point in the network where an actual break exists, thereby creating a communication path through said another node at which said end router is located, thereby enabling an alternate path to said access router for selected ones of said plurality of serially linked network nodes.

7. The system of claim 5, wherein said access router is disposed within a gateway node, and said gateway node comprises:
   at least one router in addition to said access router to provide for system redundancy in an event of failure of said access router.

8. The system of claim 5, wherein said access router operates as a hub for substantially all data communications data in said network.

9. The system of claim 1, wherein the two communication segments comprise a substantially equal number of nodes.

10. The system of claim 1, wherein the two communication segments carry a substantially equal amount of data traffic.

11. A system for providing fault tolerant data routing over a network, the system comprising:
   a plurality of nodes connected so as to form a ring network;
   bi-directional radio communication links connecting each node of said plurality of nodes to at least one immediately neighboring node in said ring network, thereby generating radio communication, wherein O.S.I. layer two switching in employed in directing data in said ring network; and at least two O.S.I. layer three routers deployed at different nodes in said ring network that cooperate to provide fault tolerant data routing in said ring network, wherein one router of said at least two routers creates a logical break in communication within the ring network during normal operating conditions.

12. The system of claim 11, wherein the O.S.I. layer two is switching Ethernet switching.

13. The system of claim 11, wherein said one router relocates said logical break in said communication within the ring network during a fault condition to a point where an actual break in communication exists in said ring network, thereby generating a relocated logical break.

14. The system of claim 13, wherein said relocated logical break produces a virtual local area network comprising all nodes in said ring network.

15. The system of claim 13, wherein virtual local area networks on at least one node of said plurality of nodes are reconfigured to enable customer data communication to proceed along an alternate path during said fault condition.

16. A system for routing data over a network, the system comprising:
   a plurality of nodes connected so as to form a ring network;
   bi-directional radio communication links connecting each node of said plurality of nodes to at least one immediately neighboring node in said ring network, wherein Ethernet switching is employed to direct data communication in said ring network;
   an access router to serve as a hub for all communication occurring within said ring network;
   an end router to form a logical break in the ring network thereby cooperating with said access router to produce two substantially operationally independent segments of said ring network; and
   a plurality of virtual local area networks connecting customer networks to said access router, wherein each virtual local area network is associated with a unique customer network.

17. The system of claim 16, wherein said end router is located in said ring network such that the two substantially operationally independent segments of said ring network transmit substantially equal data communications bandwidth.

18. The system of claim 16, wherein said end router is located in said ring network such that the two substantially operationally independent segments of said ring network comprise a substantially equal number of nodes.

19. The system of claim 16, wherein said end router is located in said ring network so as to ensure that no node exceeds a pre-established communication latency limit.

20. A system for routing data over a network, the system comprising:
   a plurality of network nodes serially linked so as to form a ring network, wherein each node of said plurality of nodes is in bi-directional communication with both of its immediately neighboring network nodes, and wherein O.S.I. layer two protocol is employed in said bi-directional communication;
   two cooperating O.S.I. layer three routers deployed on different nodes in said ring network, wherein one router of said two routers is configured to establish a logical break in the ring network thereby providing for fault tolerance in said ring network, wherein the logical break in the ring network operates to produce two substantially independent communication paths in said ring network.

21. The system of claim 20, wherein the O.S.I. layer two protocol is Ethernet protocol.

22. The system of claim 20, wherein said bi-directional communication is accomplished via a plurality of wireless radio links.

23. The system of claim 20, wherein the two substantially independent communication paths comprise a substantially equal number of nodes.

24. The system of claim 20, wherein the two substantially independent communication paths carry substantially equal data communication bandwidth.

25. A method for establishing a network, the method comprising the steps of:
   deploying a plurality of nodes in communication with one another to provide a ring network;
   establishing at least one node as an access node to provide network services to other nodes on the network:
   disposing a router at said access node to thereby provide an access router;
   establishing at least one node as a logical end node to provide segmenting of said ring;
   disposing a router at said end node to thereby provide an end router; and
   configuring said end router to provide a logical break in said ring to thereby provide said segmenting of said ring and cooperate with said access router to alter said logical break in said ring network upon a physical link failure in said ring network, relocating said logical break to a location of said physical link failure in said ring network.

26. The method of claim 25, comprising the further step of:
   locating said access node in said ring so as to facilitate connection of said access node to a wide area network.

27. The method of claim 25, comprising the further step of:
   employing Ethernet switching within substantially all nodes in said network to properly direct data in said network.

28. The method of claim 25, comprising the further step of:
   deploying a router within at least one node other than said end node and said access node to properly direct data at said at least one node.

29. The method of claim 25, comprising the further step of:
   employing bi-directional radio links to enable said plurality of nodes to communicate with one another in said ring network.

30. The method of claim 25, comprising the further step of:
   deploying at least one inter-nodal communication device at each node in said ring network.

31. The method of claim 30, comprising the further step of:
   deploying a layer two switch in each of a group of selected ones of said at least one inter-nodal communication devices.

32. The method of claim 25, comprising the further step of:
   deploying at least one customer network at selected ones of said plurality of nodes in said ring network.

33. The method of claim 32, wherein selected ones of said at least one customer networks are each associated with at least one VLAN.

34. A method for establishing a network, the method comprising the steps of:
deploying a plurality of nodes in communication with one another to provide a ring network;
establishing at least one node as an access node to provide network services to other nodes on the network;
disposing a router at said access node to thereby provide an access router:
establishing at least one node as a logical end node to provide segmenting of said ring;
disposing a router at said end node to thereby provide an end router; and
configuring said end router to provide a logical break in said ring to thereby provide said segmenting of said ring and cooperate with said access router to alter said logical break in said ring network upon an unacceptably slow communication link.

35. The method of claim 34, comprising the further step of:
locating said access node in said ring so as to facilitate connection of said access node to a wide area network.

36. The method of claim 34, comprising the further step of:
employing Ethernet switching within substantially all nodes in said network to properly direct data in said network.

37. The method of claim 34, comprising the further step of:
deploying a router within at least one node other than said end node and said access node to properly direct data at said at least one node.

38. The method of claim 34, comprising the further step of:
employing bi-directional radio links to enable said plurality of nodes to communicate with one another in said ring network.

39. The method of claim 34, comprising the further step of:
deploying at least one inter-nodal communication device at each node in said ring network.

40. The method of claim 39, comprising the further step of:
deploying a layer two switch in each of a group of selected ones of said at least one inter-nodal communication devices.

41. The method of claim 34, comprising the further step of:
deploying at least one customer network at selected ones of said plurality of nodes in said ring network.

42. The method of claim 41, wherein selected ones of said at least one customer networks are each associated with at least one VLAN.

43. A method for establishing a network, the method comprising the steps of:
deploying a plurality of nodes in communication with one another to provide a ring network;
establishing at least one node as an access node to provide network services to other nodes on the network;
disposing a router at said access node to thereby provide an access router;
establishing at least one node as a logical end node to provide segmenting of said ring;
disposing a router at said end node to thereby provide an end router;
configuring said end router to provide a logical break in said ring to thereby provide said segmenting of said ring and cooperate with said access router to alter said logical break in said ring network upon; and
locating said end node such that the segmenting of the ring provides ring segments having substantially equal communication bandwidth.

44. The method of claim 43, comprising the further step of:
locating said access node in said ring so as to facilitate connection of said access node to a wide area network.

45. The method of claim 43, comprising the further step of:
employing Ethernet switching within substantially all nodes in said network to properly direct data in said network.

46. The method of claim 43, comprising the further step of:
deploying a router within at least one node other than said end node and said access node to properly direct data at said at least one node.

47. The method of claim 43, comprising the further step of:
employing bi-directional radio links to enable said plurality of nodes to communicate with one another in said ring network.

48. The method of claim 43, comprising the further step of:
deploying at least one inter-nodal communication device at each node in said ring network.

49. The method of claim 48, comprising the further step of:
deploying a layer two switch in each of a group of selected ones of said at least one inter-nodal communication devices.

50. The method of claim 43, comprising the further step of:
deploying at least one customer network at selected ones of said plurality of nodes in said ring network.

51. The method of claim 50, wherein selected ones of said at least one customer networks are each associated with at least one VLAN.

52. A method for establishing a network, the method comprising the steps of:
deploying a plurality of nodes in communication with one another to provide a ring network;
establishing at least one node as an access node to provide network services to other nodes on the network;
disposing a router at said access node to thereby provide an access router;
establishing at least one node as a logical end node to provide segmenting of said ring;
disposing a router at said end node to thereby provide an end router;
configuring said end router to provide a logical break in said ring to thereby provide said segmenting of said ring and cooperate with said access router to alter said logical break in said ring network upon; and
locating said end node such that the segmenting of the ring provides ring segments having a substantially equal number of nodes.

53. The method of claim 52, comprising the further step of:
locating said access node in said ring so as to facilitate connection of said access node to a wide area network.

54. The method of claim 52, comprising the further step of:

employing Ethernet switching within substantially all nodes in said network to properly direct data in said network.

55. The method of claim 52, comprising the further step of:

deploying a router within at least one node other than said end node and said access node to properly direct data at said at least one node.

56. The method of claim 52, comprising the further step of:

employing bi-directional radio links to enable said plurality of nodes to communicate with one another in said ring network.

57. The method of claim 52, comprising the further step of:

deploying at least one inter-nodal communication device at each node in said ring network.

58. The method of claim 57, comprising the further step of:

deploying a layer two switch in each of a group of selected ones of said at least one inter-nodal communication devices.

59. The method of claim 52, comprising the further step of:

deploying at least one customer network at selected ones of said plurality of nodes in said ring network.

60. The method of claim 59, wherein selected ones of said at least one customer networks are each associated with at least one VLAN.

61. A method for establishing a network, the method comprising the steps of:

deploying a plurality of nodes in communication with one another to provide a ring network;

establishing at least one node as an access node to provide network services to other nodes on the network;

disposing a router at said access node to thereby provide an access router;

establishing at feast one node as a logical end node to provide segmenting of said ring;

disposing a router at said end node to thereby provide an end router;

configuring said end router to provide a logical break in said ring to thereby provide said segmenting of said ring and cooperate with said access router to alter said logical break in said ring network upon; and locating said end node such that the segmenting of the ring provides ring segments having a substantially equal risk of communication link failure.

62. The method of claim 61, comprising the further step of:

locating said access node in said ring so as to facilitate connection of said access node to a wide area network.

63. The method of claim 61, comprising the further step of:

employing Ethernet switching within substantially all nodes in said network to properly direct data in said network.

64. The method of claim 61, comprising the further step of:

deploying a router within at least one node other than said end node and said access node to properly direct data at said at least one node.

65. The method of claim 61, comprising the further step of:

employing bi-directional radio links to enable said plurality of nodes to communicate with one another in said ring network.

66. The method of claim 61, comprising the further step of:

deploying at least one inter-nodal communication device at each node in said ring network.

67. The method of claim 66, comprising the further step of:

deploying a layer two switch in each of a group of selected ones of said at least one inter-nodal communication devices.

68. The method of claim 61, comprising the further step of:

deploying at least one customer network at selected ones of said plurality of nodes in said ring network.

69. The method of claim 68, wherein selected ones of said at least one customer networks are each associated with at least one VLAN.

* * * * *